United States Patent
Luan et al.

(10) Patent No.: US 9,612,651 B2
(45) Date of Patent: Apr. 4, 2017

(54) ACCESS BASED RESOURCES DRIVEN LOW POWER CONTROL AND MANAGEMENT FOR MULTI-CORE SYSTEM ON A CHIP

(71) Applicant: Futurewei Technologies, Inc., Plano, TX (US)

(72) Inventors: Hao Luan, Plano, TX (US); Alan Gatherer, Richardson, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 43 days.

(21) Appl. No.: 14/601,981

(22) Filed: Jan. 21, 2015

(65) Prior Publication Data
US 2016/0116971 A1    Apr. 28, 2016

Related U.S. Application Data

(60) Provisional application No. 62/069,166, filed on Oct. 27, 2014.

(51) Int. Cl.
*G06F 1/00* (2006.01)
*G06F 1/32* (2006.01)
(Continued)

(52) U.S. Cl.
CPC ........ *G06F 1/3287* (2013.01); *G06F 9/45558* (2013.01); *G06F 9/5016* (2013.01); *G06F 9/5094* (2013.01); *G06F 2009/45583* (2013.01)

(58) Field of Classification Search
CPC ........................................................ G06F 1/32
See application file for complete search history.

(56) References Cited

U.S. PATENT DOCUMENTS

| | | | | |
|---|---|---|---|---|
| 5,619,707 A | * | 4/1997 | Suboh | G06F 1/3218 |
| | | | | 713/322 |
| 7,081,897 B2 | * | 7/2006 | Garg | G06F 1/3203 |
| | | | | 345/543 |

(Continued)

FOREIGN PATENT DOCUMENTS

| | | |
|---|---|---|
| CN | 103814342 A | 5/2014 |
| CN | 103930874 A | 7/2014 |
| WO | 2012087957 A1 | 6/2012 |

OTHER PUBLICATIONS

International Search Report and Written Opinion dated Jan. 21, 2016 in International Patent Application No. PCT/CN2015/092461, 11 pages.

*Primary Examiner* — Mohammed Rehman
(74) *Attorney, Agent, or Firm* — Futurewei Technologies, Inc.

(57) ABSTRACT

Function resources/memory resources and an associated resource controller configured to assign a first portion of the function resources/memory resources to at least one processing element in response to an access request from the processing element. The resource controller changes a power mode of the first portion of the function resources/memory resources as a function of the first portion assignment, and leaves an unassigned portion of the function resources/memory resources in a power down mode in a self-governing nature. The resource controller enables the processing element to access the first portion of the function resources/memory resources in response to the access request received from the processing element. The function resources/memory resources, resource controllers and one or more processing elements may comprise a system on a chip (SoC).

20 Claims, 6 Drawing Sheets

(51) Int. Cl.
*G06F 9/50* (2006.01)
*G06F 9/455* (2006.01)

(56) References Cited

U.S. PATENT DOCUMENTS

| | | |
|---|---|---|
| 2013/0046934 A1* | 2/2013 | Nychka ............... G06F 12/0897 |
| | | 711/119 |
| 2013/0073794 A1* | 3/2013 | Iwashiro ............... G06F 1/3275 |
| | | 711/103 |
| 2013/0073884 A1 | 3/2013 | Ulmer et al. |
| 2013/0125130 A1 | 5/2013 | Stubbs et al. |
| 2013/0332763 A1* | 12/2013 | Palaniappan .......... G11O 5/148 |
| | | 713/324 |
| 2014/0089604 A1 | 3/2014 | Holland et al. |
| 2014/0365707 A1* | 12/2014 | Talagala .............. G06F 12/0246 |
| | | 710/308 |
| 2015/0193299 A1* | 7/2015 | Hyun ..................... G11C 29/52 |
| | | 714/6.24 |
| 2015/0262696 A1* | 9/2015 | Sakata ................ G06F 12/0802 |
| | | 365/185.18 |

* cited by examiner

FIG. 5

ACCESS BASED RESOURCES DRIVEN LOW POWER CONTROL AND MANAGEMENT FOR MULTI-CORE SYSTEM ON A CHIP

This application claims the benefit of U.S. Provisional Application No. 62/069,166, filed on Oct. 27, 2014, entitled "Access based resources driven low power control and management for multi-core system on a chip," which application is hereby incorporated by reference in its entirety.

TECHNICAL FIELD

The present disclosure relates generally to power management, and more particularly to power management in a system on a chip (SoC), such as a function resource/memory resource controller/scheduler.

BACKGROUND

"Go Green" is a worldwide initiative to make the world a better place to work and live. Information, communications and telecommunications are essential and ubiquitous to the daily life of everyone.

Today's base band system on a chip (SoC) has multiple homogenous and heterogeneous digital signal processor (DSP)/central processing unit (CPU) elements, hardware accelerators etc. (collectively "processing elements") accessing the same memory blocks, versus the tradition architectures where a single DSP/CPU processing element manages the entire resources on chip. In prior devices, one DSP/CPU element owned all the resources and accessed them with physical addressing. Low power management for the memory resources was managed and initiated by the DSP/CPU element. Static and explicit memory organization was done by the DSP/CPU element. Memory resources behaved like a dummy slave without any intelligence in terms of power and memory resources management.

This methodology become more and more cumbersome for a multiple processing element scenario since each processing element allocates and accesses the shared resources independently, making power management effectively a game theory problem.

SUMMARY

The present disclosure provides an access based low power consumption methodology for a high-speed, complex and low power function/memory system.

According to a first example embodiment of the disclosure, a method comprises receiving, by a resource controller associated with function resources/memory resources, an access request from a processing element to access a portion of the function resources/memory resources. The resource controller assigns a first portion of the function resources/memory resources to the processing element in response to the access request, changes a power mode of the first portion of the function resources/memory resources as a function of the first portion assignment, and leaves an unassigned portion of the function resources/memory resources in a power down mode.

In some embodiments, the resource controller changes the power mode of the first portion from a power down mode to a light sleep mode. After multiple clock cycles, for instance, at least 2 clock cycles, after the first portion assignment, the resource controller changes the power mode of the first portion to a power up mode when the first portion is accessed by the processing element. The processing element may comprise a digital signal processor (DSP), a central processing unit (CPU), a hardware accelerator etc. performing a dedicated functionality. In some embodiments, the function resources/memory resources, the resource controller and processing element are part of a system on a chip (SoC). The resource controller selectively controls a read/write access to the function resources/memory resources in response to the access requests, and the memory resource may comprise one or more banks of memory. The resource controller receives the access request from the processing element and the resource controller controls the assignment of the function resources/memory resources responsive to receiving the access request.

In another example embodiment, a circuit comprises function resources/memory resources and a resource controller associated with the function resources/memory resources. The resource controller is configured to assign a first portion of the function resources/memory resources to a processing element in response to an access request received from the processing element, change a power mode of the first portion of the function resources/memory resources as a function of the first portion assignment, leave an unassigned portion of the function resources/memory resources in a power down mode, and enable the processing element to access the first portion of the function resources/memory resources in response to the access request received from the processing element.

In some embodiments, the resource controller is configured to change the power mode of the first portion from a power down mode to a light sleep mode in response to the first portion assignment. The resource controller is configured to change the power mode of the first portion to a power up mode after multiple clock cycles, such as at least 2 clock cycles, after the first portion assignment. The processing element may comprise a digital signal processor (DSP), a central processing unit (CPU) or a hardware accelerator. The resource controller is configured to selectively control a read/write access to memory resources in response to the access request, and the memory resources comprise one or more banks of memory.

In another embodiment, a system on a chip (SoC) comprises a processing element and a resource controller associated with function resources/memory resources. The resource controller is configured to assign a first portion of the function resources/memory resources to the processing element in response to an access request from the processing element, change a power mode of the first portion of the function resources/memory resources as a function of the first portion assignment, leave an unassigned portion of the function resources/memory resources in a power down mode, and enable the processing element to access the first portion of the function resources/memory resources in response to the access request received from the processing element.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 5 is a diagram illustrating the timing of the processing elements accessing memory resources;

DETAILED DESCRIPTION

Figure 1:
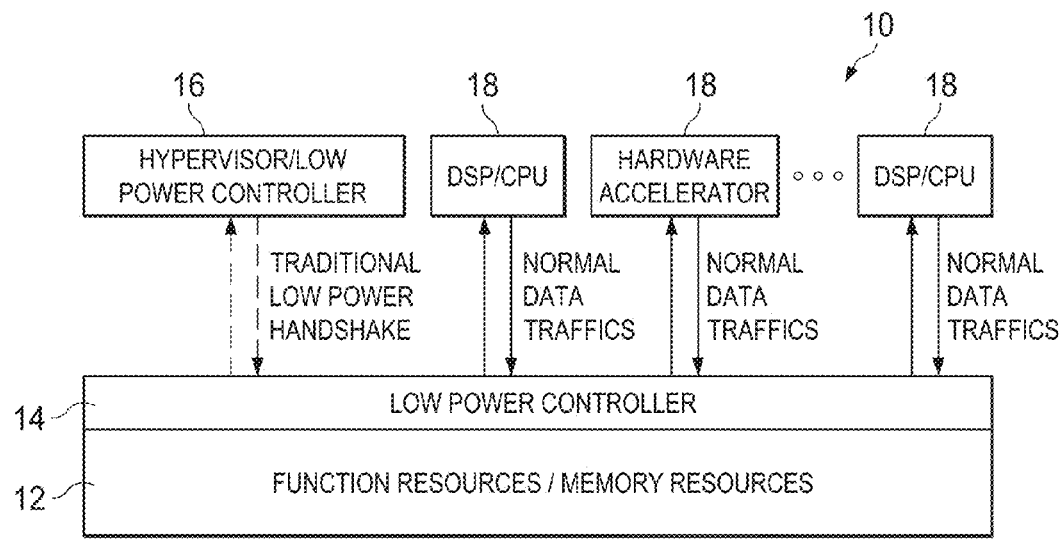
FIG. 1 illustrates memory resources accessed by a plurality of processing elements, where access is controlled by a remote hypervisor/low power controller.

Referring to FIG. 1, there is shown a conventional system on a chip (SoC) 10 including conventional function resources/memory resources 12, such as memory banks, having a low power controller 14. A central hypervisor/low power controller 16 of the SoC 10 is configured to manage the low power for all of the processing elements 18 and resources 12 on the SoC 10. Based on different system requirements and loading, the controller 16 selectively puts processing elements 18 and resources 12 in a pre-defined low power mode through handshaking between the low power controller 16 and the resources 12 and processing elements 18. The low power controller 14 for the resources 12 handles the low power handshaking with the controller 16 to receive appropriate low power control commands and act accordingly to put the resources 12 in the corresponding states as instructed by the low power control commands. Resources 12 behave like a dummy slave and are not involved at all in the decision process for its own power state management.

The disadvantages for such an implementation are that the centralized low power management controller 16 cannot always keep up-to-date to the overall SoC 10 system operation and loading due to the dynamic nature of the multi-element SoC 10. Each processing element 18 can either work independently or work closely with another processing element 18, which makes the system loading and power consumption vary a lot from time to time. It is almost impossible for one centralized low power controller 16 to always make smart and intelligent decision on the fly. Also, the granularity of the low power management is coarse since it always operates on a few pre-defined static low power states, which results with more power being consumed overall.

Figure 2:
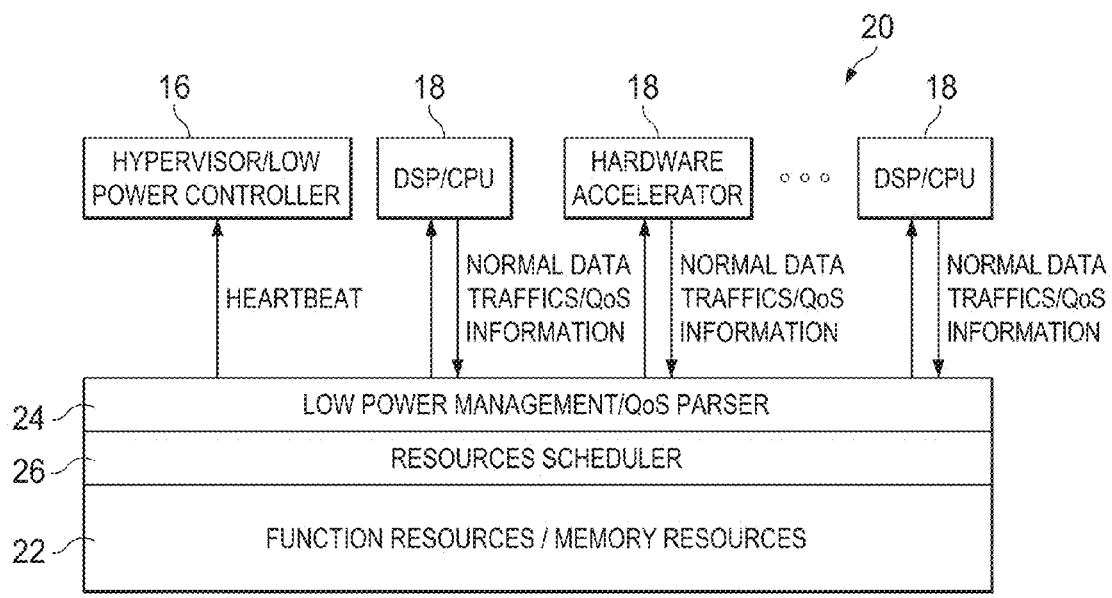
FIG. 2 illustrates memory resources having a resident QoS parser and resources scheduler accessible by a plurality of processing elements according to this disclosure.

Referring to FIG. 2, there is shown an example embodiment according to this disclosure including a SoC 20 having function resources/memory resources 22 (collectively sometimes referred to as "resources") managed by an associated resident low power manager/quality of service (QoS) parser 24 and a resources scheduler 26 (sometimes collectively referred to as "resource controller"). The function resources/memory resources 22 comprise, for instance, one or more banks of individually addressable and controllable memory, and a power management policy application programming interface (API). The processing element 18 comprises one of a digital signal processor (DSP), a central processing unit (CPU), and a hardware accelerator. Each processing element 18 is configured to directly make requests for portions of function resources/memory resources 22 with QoS parameters, and the resources scheduler 26 and low power manager/QoS parser 24 responsively assign function resources/memory resources 22. The processing elements 18 are configured to submit, and the power management API is configured to receive, power management policy parameters, such as access patterns, gaps between accesses, low power requirements between the access gaps etc. The resources scheduler 26 and low power manager/QoS parser 24 are configured to responsively allocate function resources/memory resources 22 to processing elements 18, and advantageously, carry out low power control locally based on its policy, instead of being managed by the multiple processing elements 18.

The processing elements 18 may use virtual addressing or message transfer that conveys metadata, which enables the resources scheduler 26 and low power manager/QoS parser 24 to efficiently manage memory organization of function resources/memory resources 22 at the lowest power while still maintaining QoS.

The resources scheduler 26 and low power manager/QoS parser 24 manage banks of function resources/memory resources 22 in a power down mode until their use has been assigned by the resources scheduler 26 and low power manager/QoS parser 24. This is not possible in a simple, random access memory (RAM).

Once function resources/memory resources 22 are assigned to a processing element 18, power access messages from the processing elements 18 allow the resources scheduler 26 and low power manager/QoS 24 to put unassigned function resources/memory resources 22 in other sleep modes, such as light sleep. Once function resources/memory resources 22 are de-assigned, they are put back to an appropriate power down mode.

The resources scheduler 26 and low power manager/QoS comprise a service oriented low power control and management system that is self-governing and an autonomous system, where the service fulfilling modules provide the necessary services requested by the masters/requestors while managing the modules by themselves particularly from lower power management perspective. A scheduler inside of the resource controller 26 is responsible for allocating memory resources on the fly. Also, the scheduler sends appropriate low power controller signals to individual banks of memory.

As shown in FIG. 2, all service requests are passed by the masters/requestors, the processing elements 18, in a form of a "service contract" where the service request defines the following information:

1. What kind of the service/task: i.e Fast Fourier Transform (FFT);
2. When the service/task is expected to be completed: i.e number of clock cycles; and
3. How much data will be processed: i.e. 512 bytes or 1024 bytes etc.

The "service contract information" is a set of rich metadata which informs the resources scheduler 26 with parameters, such as how important the access is, how soon or urgent this particular access must be served, QoS requirements, etc. The resources scheduler 26 schedules the resource access to the function resources/memory resources 22 based on this information and decides to serve the current access right away, or group it with other accesses together, to turn on a particular memory bank (which is still in a low power state at this point) later in order to save more power.

Once the QoS parser 24, which is sitting in front of the service fulfilling resources scheduler 26 receives the "service contract information", the QoS parser 24 starts to process the "service contract information" based on the current working loads, splits the service contract to small pieces, and schedules the sub tasks to the resources scheduler 26 to make sure that QoS is guaranteed while saving the power as much as possible.

QoS parser 24 is designed to use one or multiple low power techniques described above to achieve the goal of saving power.

If, for instance, the function resources/memory resources 22 have numerous banks of memory, the QoS parser 24 can put the function resources/memory resources 22 right into the light sleep/deep sleep modes depending on the number of outstanding sub tasks which have memory read/write accesses.

The QoS parser 24 can also clock gate or even power off a portion of function resources/memory resources 22 if such a sub function will not be used for a foreseeable future.

If the current throughput/bandwidth requirement is not very high, the QoS parser 24 can also dial down the running frequency to ½, ⅓ or ¼ if necessary.

The QoS parser 24 is the last sub module to be clock/power gated since it is the local center office, while the rest of the function resources/memory resources 22 can be in operation or idling (clock/power off), which purely depends on the current working mode/loads.

A status signal provides "heart beat" information to the central hypervisor/low power controller 16. The frequency of the heart beat signal is proportional to how active a service fulfilling module is running.

Another salient feature of the QoS driven low power control and management methodology is that the function fulfilling modules/sub modules, the function resources/memory resources 22, activate low power schemes based on "data" instead of commands issued from masters/requestors. One could consider "data" is water flowing through pipes, where "data" is water vs the processing elements are pipes in this analogy. Once there isn't any data to be processed, all the pipes could be put into idle which saves more power compared to wait till masters/requestors to inform the fulfilling modules to do so.

Figure 3:
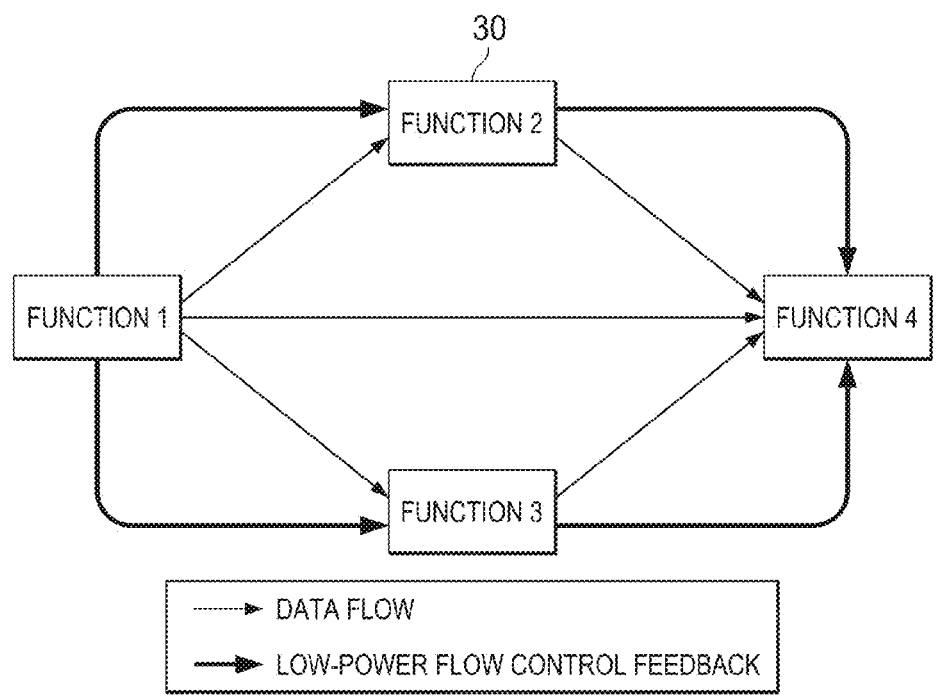
FIG. 3 illustrates fine-granularity low-power control based on data flow.

As shown in FIG. 3, this disclosure takes advantage of the system-level data flow. Besides each function 30 (or block) sensing its idleness and coming to a low-power state, the function 30 (block) gets a low-power flow-control signal from the preceding functions 30 (blocks) in advance sensing that it will or will not have any data to process sometime in the future and thus can enter a low-power state. For example, if the Function 1 block has no data to process and is thus idle, it will send low-power feedback signals to the following blocks to notify them that they should also expect no data (some time in the future) and can transition to a low-power mode.

Advantageously, the resources scheduler 26 and the low power manager/QoS parser 24 provide better and more efficient, flexible and more scalable, low power management methodology to further reduce power in multi-core SoC chips with finer granularity. Lower power means a lower power bill, less number of cooling fans, and smaller chassis, which turns to more savings to the end customers.

Figure 4:
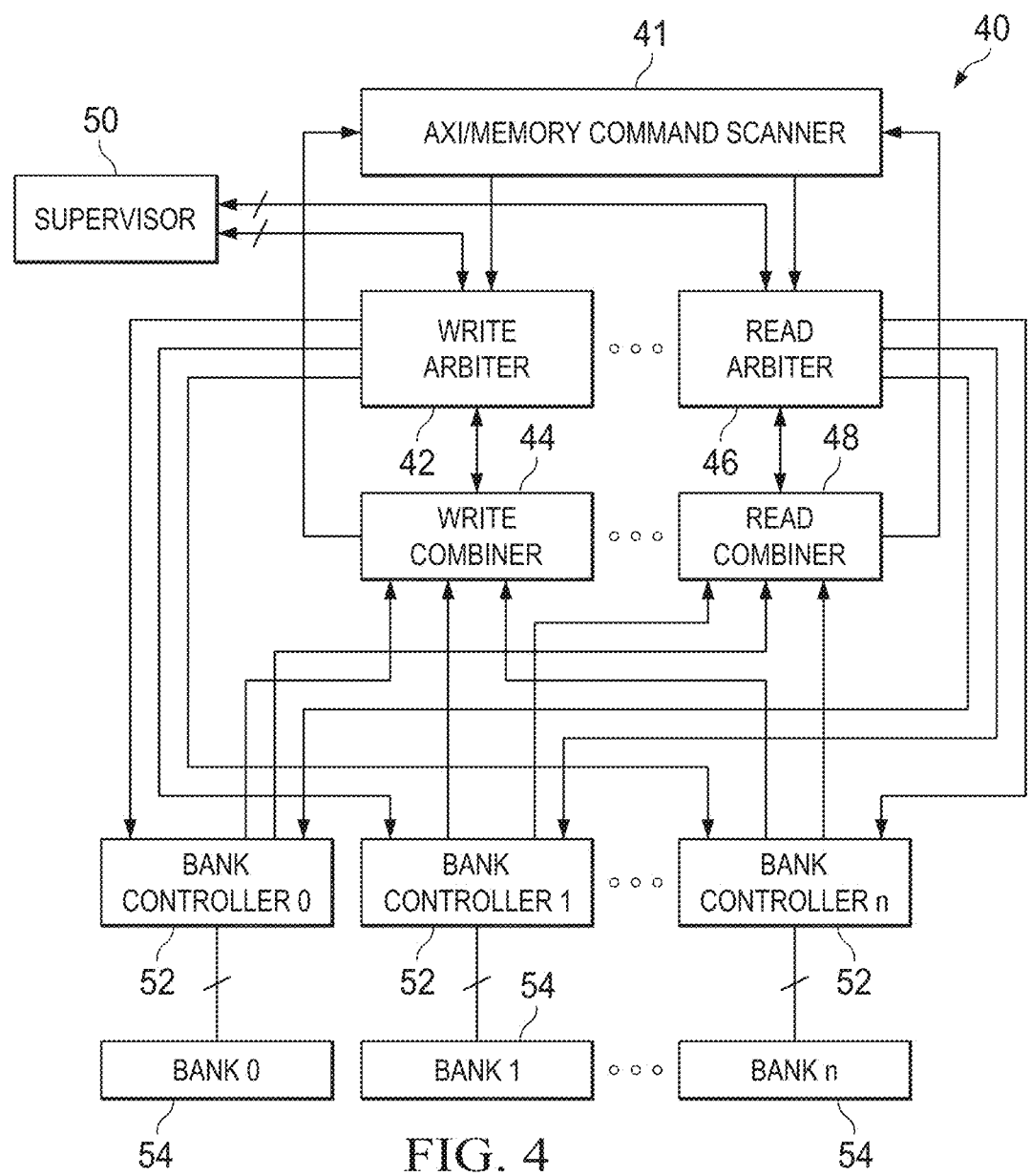
FIG. 4 illustrates a block diagram of the memory resources.

Referring to FIG. 4, there is shown one example block diagram of the memory controller 40. Memory controller 40 includes an AXI/memory command scanner 41, a write arbiter 42, a write combiner 44, a read arbiter 46 and a read combiner 48. The write arbiter 42 and read arbiter 46 are configured to be managed by a supervisor 50. Advantageously, memory controller 40 also includes a plurality of bank controllers 52, each configured to control access to one or more respective memory banks 54. The plurality of memory banks 54 in some embodiments comprises the function resources/memory resources 22. The memory controller 40 in some examples sends appropriate low power controller signals to individual or multiple banks of memory.

Figure 5:
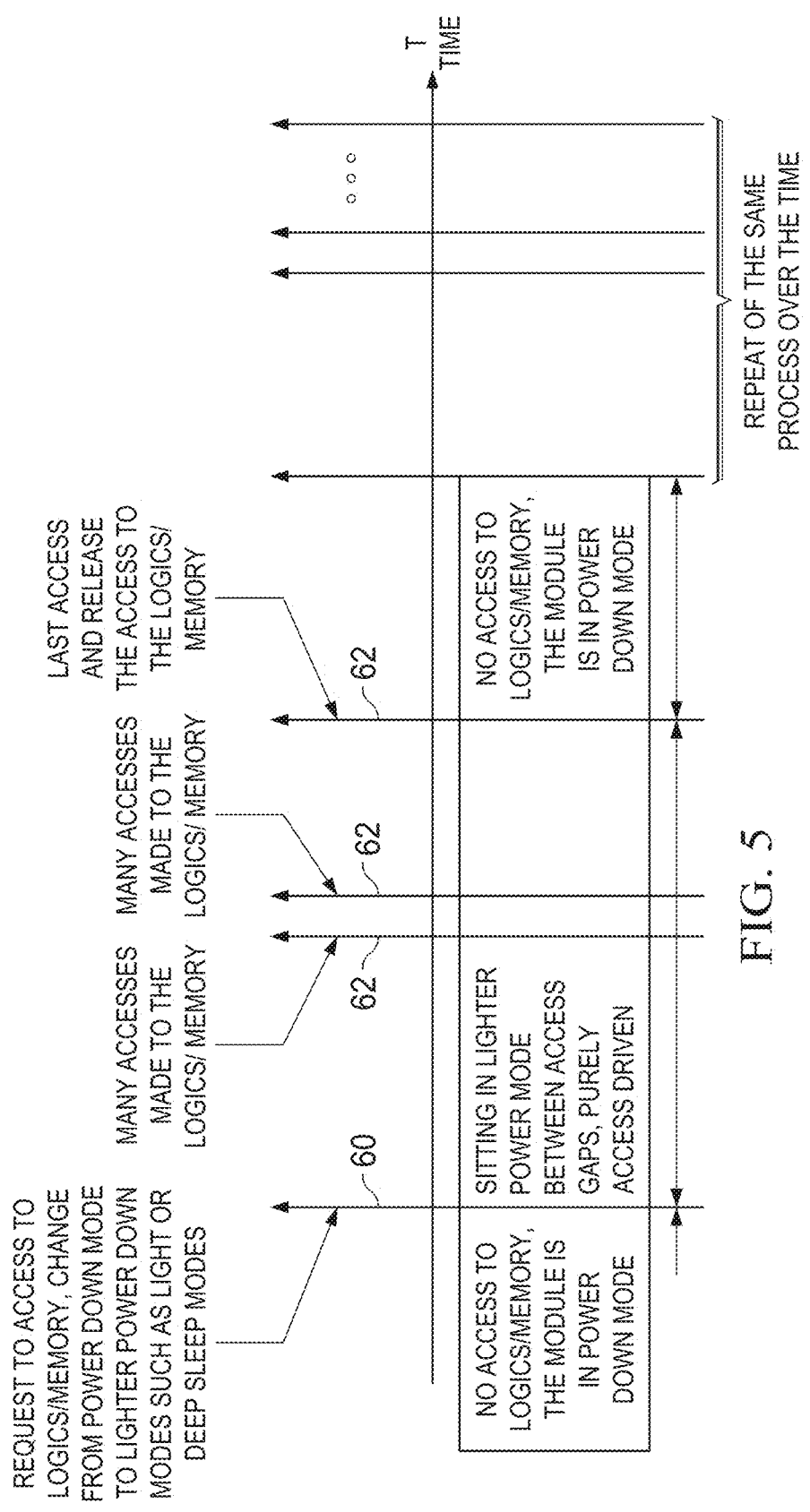

FIG. 5 is a diagram illustrating timing of the processing elements 18 accessing function resources/memory resources 22, and the unassigned resources remaining in a power down mode. As shown at 60, upon a request from a processing element 18 for access to function resources/memory resources 22, the resources scheduler 26 and QoS parser 24 changes the power mode of an assigned function resources/memory resources 22 to change from a power down mode to a lighter power mode, such as from normal operation to light sleep mode, or from lighter sleep to deep sleep etc. In an example embodiment, there may be 3-4 clock cycles before the requesting processing element 18 is granted access to the assigned function resources/memory resources 22, shown at 62, where the accessed assigned function resources/memory resources 22 are in a normal power mode. The latency of this 3-4 clock cycle period is fully utilized to ramp up the power of the assigned function resources/memory resources 22, such that the latency is not a penalty, but rather, a benefit. The resources scheduler 26 and QoS parser intelligently manage the entire function resources/memory resources 22 in light sleep, deep sleep or power down/clock gating which greatly reduces the overall power consumption. After the last function resources/memory resources access, the assigned function resources/memory resources 22 are configured back down to a sleep mode. This process repeats when function resources/memory resources 22 access is again requested by a processing element 18.

Referring to FIG. 4 and FIG. 5, in one example embodiment, the QoS parser 24 and resources scheduler 26 controls a memory region consisting of multiple addressable banks 54, each bank 54 having linear or interleaved physical banks, for example.

QoS parser 24 and resources scheduler 26 oversee the entire memory space and know which region of addressable bank 54 is currently active or in a low power mode. If bank 4 of addressable bank 3 is in light sleep mode, and it has one read access to its location that needs to be served within 30 cycles later, and another read to another location that needs to be served within 28 cycles later, QoS parser 24 schedules the two reads together while still keeping this bank in the light sleep mode for another 20 clock cycles, then starts to wake up the bank which normally takes 3 to four clock cycles, executes the reads to meet QoS, and then puts it back to light sleep mode again if there isn't more reads to this bank.

Since an AXI bus protocol consists of five channels (AW, AR, R, W, B), plus some user-defined sideband signals which are used to improve the performance, all the information together is considered as metadata.

For example, with a read coming into the QoS parser 24 and resources scheduler 26, address, length of read, and priority is available from the AR channel signals. The sideband signals can be configured together by processing elements 18 to carry other important information such as how soon they should be served etc.

For both AW and AR channels, there is a built-in Request/Ready handshake scheme that is used to throttle the request. This is very important feature to avoid over running the QoS parser.

Figure 6:
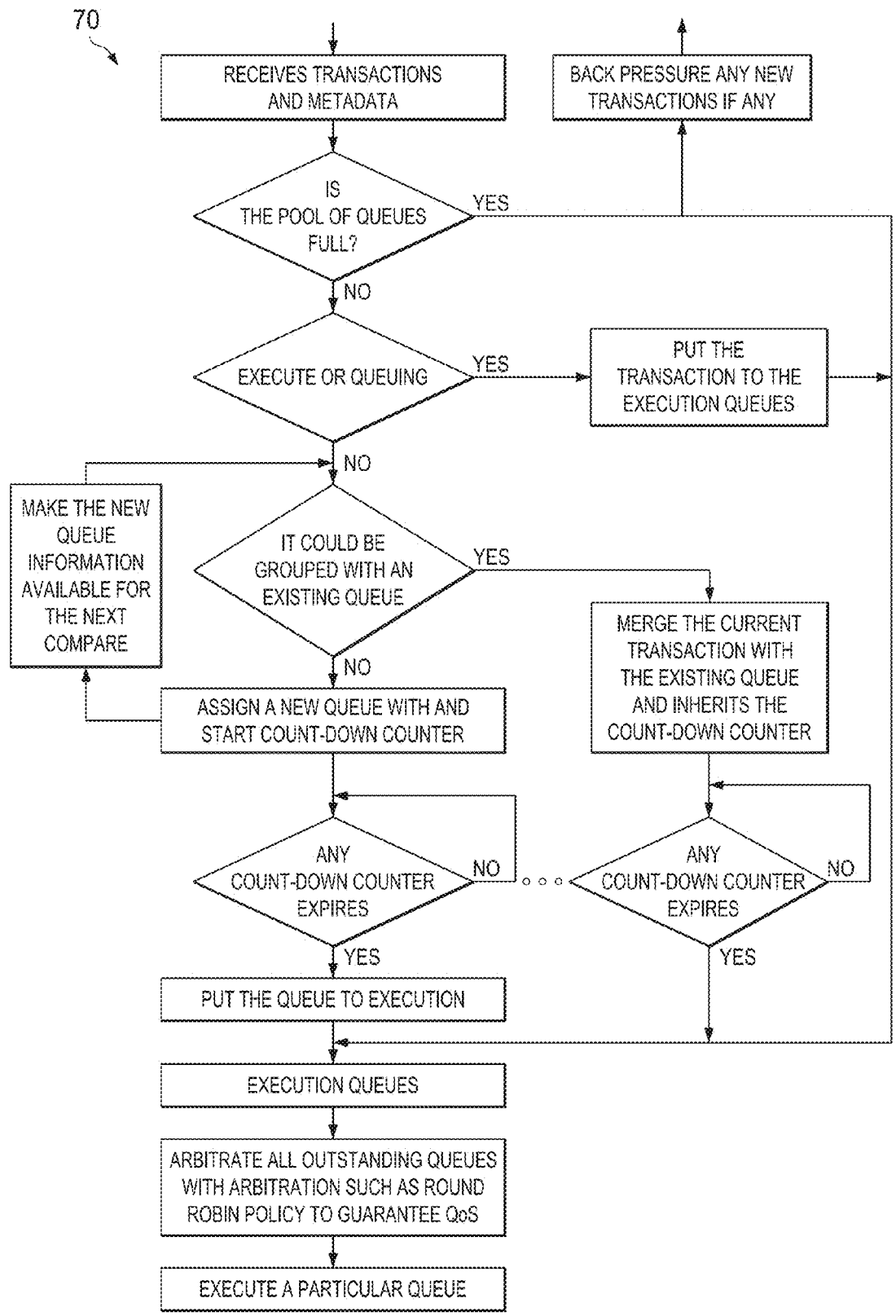
FIG. 6 illustrates a method of avoiding/managing a stall.

If there are a lot of requests come into the QoS parser 24 and resources scheduler 26, the QoS parser 24 and resources scheduler 26 could quickly reach the upper limit of how many outstanding reads/writes it could serve. In such a situation, the QoS parser 24 and resources scheduler 26 stall the traffic briefly with the back pressure handshake scheme, and the low power feature is turned off completely to guarantee QoS till the outstanding numbers of reads/writes drop below a threshold. One example methodology is shown at 70 in FIG. 6.

To avoid or minimize a stall, the transaction is served with less time by interleaving memory, such as to eight or sixteen memory banks. For example, if there is a transaction read from address 0 to 7, it will take a linear memory eight clock cycles to finish, however, it will only take one clock cycle if the memory address is interleaved by eight because it can take the data all together from eight different pieces of memory at the same time.

Figure 7:
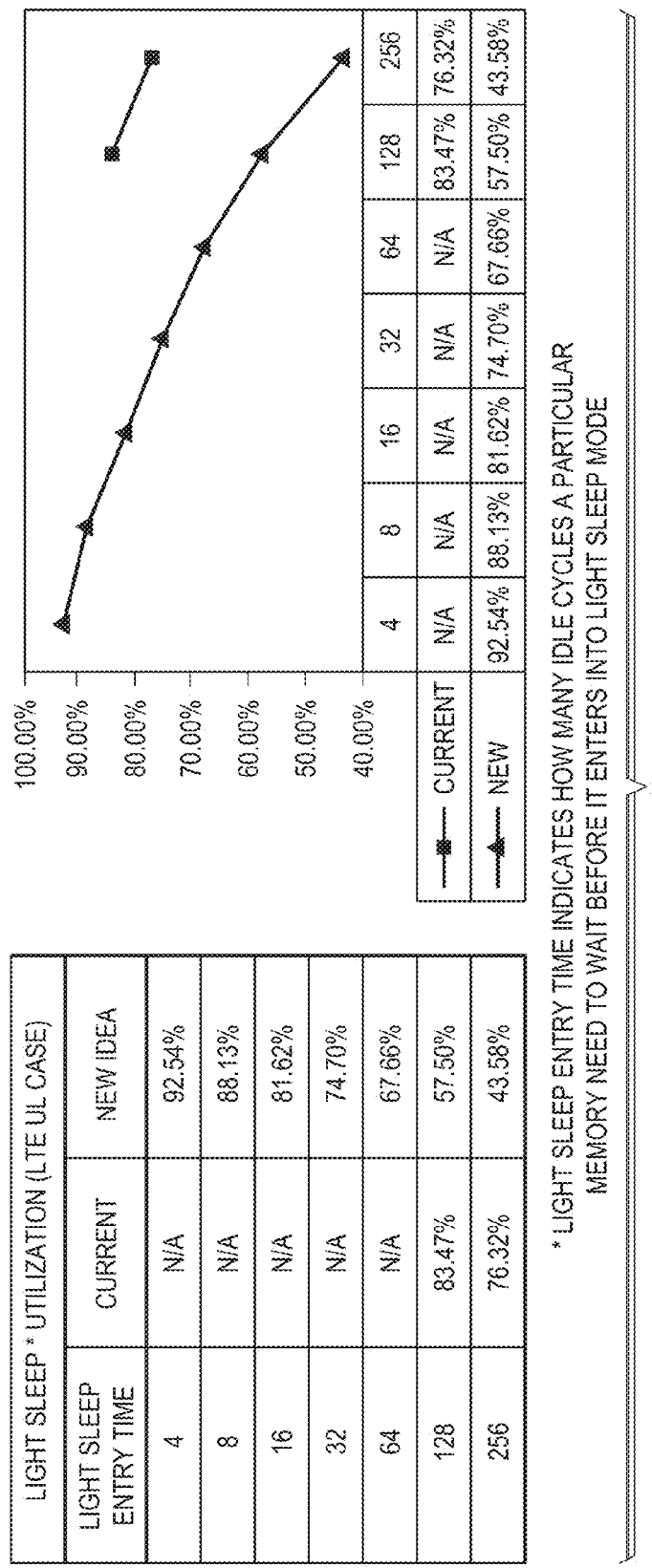
FIG. 7 illustrates a comparison of the disclosure to a convention approach.

Referring to FIG. 7, there is shown a comparison of the present disclosure to a conventional solution. In a conventional solution, memory could enter into light sleep mode in 4 to 64 clock cycles, however, blindly entering into light sleep mode in 4-64 clock cycles would greatly impact the overall read and write access latency. Thus, it has to scale up to 128 clock cycles as shown just to avoid performance degradation.

The present disclosure can fully utilize 4 clock cycles entry time without impacting the performance since it has the built-in memory manager comprising QoS parser 24 and resources scheduler 26, which may be an improvement of 9% for the utilization.

This disclosure advantageously changes the responsibilities of power and resources management from one or many masters (i.e processing elements 18) to the slave (i.e the resources scheduler 26 and QoS parser 24 servicing the function resources/memory resources 22). The access based resources scheduler 26 and QoS parser 24 save power while the function resources/memory resources 22 are not being requested for access, and in the gaps between the multiple accesses.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   receiving, by a resource controller associated with a function resources/memory resources, an access request from a processing element to access a portion of the function resources/memory resources;
   assigning, by the resource controller, a first portion of the function resources/memory resources to the processing element in response to the access request;
   changing, by the resources controller, a power mode of the first portion of the function resources/memory resources as a function of the first portion assignment and leaving an unassigned portion of the function resources/memory resources in a power down; and
   granting access of the processing element to the first portion of the function resources/memory resources in response to the access request received from the processing element, wherein
   the access request comprises metadata defining a quality of service (QoS), and
   the metadata is divided into sub-tasks based on workload for a resources scheduler to satisfy the defined QoS.

2. The method as specified in claim 1, wherein the resources controller, the function resources/memory resources, and the processing element are part of a system on a chip (SoC).

3. The method as specified in claim 2 wherein the resource controller assigns the function resources/memory resources in response to access requests from a plurality of processing elements.

4. The method as specified in claim 1, wherein the changing by the resource controller comprises:
   changing the power mode of the first portion from a power down mode to a light sleep mode.

5. The method as specified in claim 4, wherein the changing by the resource controller comprises:
   at least 2 clock cycles after the first portion assignment, changing the power mode of the first portion to a power up mode when the first portion is accessed by the processing element.

6. The method as specified in claim 1, wherein the processing element comprises one of a digital signal processor (DSP), a central processing unit (CPU), and a hardware accelerator.

7. The method as specified in claim 1, wherein the resource controller selectively controls a read/write access to the function resources/memory resources in response to the access request, and the function resources/memory resources comprises one or more banks of memory.

8. The method as specified in claim 1, wherein the resource controller receives the access request from the processing element and the resource controller controls the assignment of the function resources/memory resources responsive to receiving the access request.

9. The method as specified in claim 1, wherein the resource controller comprises a quality of service (QoS) parser, wherein the access request comprises metadata defining a QoS with or without using messaging.

10. The method as specified in claim 9, wherein the resource controller also comprises a resource scheduler, wherein the resource scheduler and the QoS parser self-govern the power mode of the function resources/memory resources.

11. A circuit, comprising:
    function resources/memory resources; and
    a resource controller associated with the function resources/memory resources and configured to:
    assign a first portion of the function resources/memory resources to a processing element in response to an access request received from the processing element;
    change a power mode of the first portion of the function resources/memory resources as a function of the first portion assignment, and leave an unassigned portion of the function resources/memory resources in a power down mode, wherein the first portion of the function resources/memory resources receives a power control feedback signal indicating whether to change the power mode; and grant access of the processing element to the first portion of the function resources/memory resources in response to the access request received from the processing element, wherein the access request comprises metadata defining a quality of service (QoS), and the metadata is divided into sub-tasks based on workload for a resources scheduler to satisfy the defined QoS.

12. The circuit as specified in claim 11, wherein the resource controller is configured to change the power mode of the first portion from a power down mode to a light sleep mode as a function of the first portion assignment.

13. The circuit as specified in claim 12, wherein the resource controller is configured to change the power mode of the first portion to a power up mode at least 2 clock cycles after the first portion assignment.

14. The circuit as specified in claim 11, wherein the resource controller comprises a quality of service (QoS) parser and the access request comprises metadata defining a QoS, and the QoS parser divides the metadata into sub-tasks based on workload and schedules the sub-tasks to the resources scheduler to satisfy the defined QoS.

15. The circuit as specified in claim 14, wherein the resource controller also comprises a resource scheduler configured to selectively control a read/write access to the function resources/memory resources in response to the access request, and the function resources/memory resources comprises one or more banks of memory.

16. A system on a chip (SoC), comprising:

a processing element; and a resource controller associated with function resources/memory resources, the resource controller configured to:

assign a first portion of the function resources/memory resources to the processing element in response to an access request from the processing element;

change a power mode of the first portion of the function resources/memory resources as a function of the first portion assignment, and leave an unassigned portion of the function resources/memory resources in a power down mode; and grant access of the processing element to the first portion of the function resources/memory resources in response to the access request received from the processing element, wherein the access request comprises metadata defining a quality of service (QoS), and the metadata is divided into sub-tasks based on workload for a resources scheduler to satisfy the defined QoS.

17. The SoC as specified in claim 16, wherein the resource controller receives the access request from the processing element and the resource controller controls the first portion assignment of the function resources/memory resources responsive to receiving the access request.

18. The SoC as specified in claim 17, wherein the resource controller is comprised of a quality of service (QoS) parser and a resource scheduler, wherein the resource scheduler and the QoS parser self-govern the power mode of the function resources/memory resources.

19. The SoC as specified in claim 18, wherein the resource controller is configured to change the power mode of the first portion to a power up mode at least 2 clock cycles after the first portion assignment.

20. The SoC as specified in claim 18, wherein the resource controller is configured to selectively control a read/write access to the function resources/memory resources response to the access request, and the function resources/memory resources comprises one or more banks of memory.

* * * * *